United States Patent
Campbell et al.

(10) Patent No.: US 12,055,182 B2
(45) Date of Patent: Aug. 6, 2024

(54) METHOD OF MANUFACTURING A STRIP FOR A BEARING

(71) Applicants: Mahle International GmbH, Stuttgart (DE); Mahle Engine Systems UK Ltd, Rugby (GB); Mahle Metal Leve S/A, Jundiai-Sp (BR)

(72) Inventors: Sylvia Campbell, Lanarkshire (GB); Paulo R. Vieira De Morais, São Bernardo do Campo (BR)

(73) Assignees: Mahle International GmbH (DE); Mahle Engine Systems UK Ltd. (GB); Mahle Metal Leve S/A (BR)

( * ) Notice: Subject to any disclaimer, the term of this patent is extended or adjusted under 35 U.S.C. 154(b) by 0 days.

(21) Appl. No.: 17/552,528

(22) Filed: Dec. 16, 2021

(65) Prior Publication Data

US 2022/0186781 A1 Jun. 16, 2022

(30) Foreign Application Priority Data

Dec. 16, 2020 (GB) .................................... 2019851

(51) Int. Cl.
| | |
|---|---|
| *B21B 1/38* | (2006.01) |
| *C21D 9/40* | (2006.01) |
| *C22F 1/04* | (2006.01) |
| *F16C 33/12* | (2006.01) |
| *F16C 33/14* | (2006.01) |

(52) U.S. Cl.
CPC ................ *F16C 33/14* (2013.01); *C21D 9/40* (2013.01); *C22F 1/04* (2013.01); *F16C 33/121* (2013.01); *F16C 33/125* (2013.01); *B21B 2001/383* (2013.01); *F16C 2204/20* (2013.01); *F16C 2220/44* (2013.01); *F16C 2360/22* (2013.01)

(58) Field of Classification Search
None
See application file for complete search history.

(56) References Cited

U.S. PATENT DOCUMENTS

| | | | |
|---|---|---|---|
| 3,195,991 | A | 7/1965 | Stern |
| 4,361,629 | A | 11/1982 | Mori |
| 6,439,451 | B1 | 8/2002 | Kagohara |
| 8,053,087 | B2 | 11/2011 | Neuhaus |
| 9,562,565 | B2 * | 2/2017 | Kachoosangi ........ F16C 33/124 |

(Continued)

FOREIGN PATENT DOCUMENTS

| | | |
|---|---|---|
| CN | 1358584 A | 7/2002 |
| CN | 101180472 A | 5/2008 |

(Continued)

OTHER PUBLICATIONS

Translation of DE-102007049383-A1 (Year: 2009).*

(Continued)

*Primary Examiner* — Jacob J Cigna
(74) *Attorney, Agent, or Firm* — Fishman Stewart PLLC

(57) ABSTRACT

A method of manufacturing a strip for a bearing may comprise roll-bonding a bearing layer comprising a tin-free aluminium alloy directly to a base layer to form a bimetal and heat-treating the bimetal at a temperature below a recrystallization initiation temperature of the aluminium alloy. A strip for a bearing manufactured using the method, and a bearing having a strip manufactured using the method, are also provided.

20 Claims, 5 Drawing Sheets

(56) References Cited

U.S. PATENT DOCUMENTS

| | | |
|---|---|---|
| 10,494,701 B2 | 12/2019 | Buerkle |
| 2005/0221110 A1 | 10/2005 | Fujita |
| 2007/0082825 A1 | 4/2007 | Kawakami et al. |
| 2013/0318795 A1 | 12/2013 | Schmitt et al. |
| 2017/0067472 A1* | 3/2017 | Day .................. F16C 33/122 |
| 2018/0200991 A1 | 7/2018 | Langbein |
| 2020/0109744 A1* | 4/2020 | Cosentino ............. C22C 21/18 |

FOREIGN PATENT DOCUMENTS

| | | | |
|---|---|---|---|
| CN | 106574659 A | 4/2017 | |
| CN | 107848257 A | 3/2018 | |
| CN | 110418904 A | 11/2019 | |
| DE | 840920 C | 6/1952 | |
| DE | 102007049383 A1 * | 4/2009 | ......... B32B 15/015 |
| DE | 102011004133 A1 | 8/2012 | |
| EP | 1522750 A1 * | 4/2005 | ............ B32B 15/01 |
| FR | 1310088 A | 3/1963 | |
| GB | 749529 A | 5/1956 | |
| GB | 822346 A | 10/1959 | |
| GB | 1111218 A | 4/1968 | |
| GB | 2 144 061 A | 2/1985 | |
| GB | 2 358 406 A | 7/2001 | |
| GB | 2529384 A * | 2/2016 | ............ F16C 33/12 |
| WO | WO-19/137673 A1 | 7/2019 | |

OTHER PUBLICATIONS

European Search Report dated Apr. 15, 2022 for copending European Patent App. No. EP21214136.
Great Britain Search Report for GB-2019851.1, dated Jan. 20, 2021.
Chinese First Office Action dated Sep. 27, 2023 and Chinese Search Report dated Sep. 25, 2023 for Chinese Patent Application No. 2021115344172.

* cited by examiner

METHOD OF MANUFACTURING A STRIP FOR A BEARING

CROSS-REFERENCE TO RELATED APPLICATION

This application claims priority to Great Britain Application No. GB 2019851.1 filed on Dec. 16, 2020, the contents of which are hereby incorporated by reference in its entirety.

TECHNICAL FIELD

The invention relates to a method of manufacturing a strip for a bearing.

The method is particularly suitable for manufacturing a bimetal strip comprising a tin-free aluminium alloy.

The invention further relates to a strip for a bearing manufactured by the method.

The invention further relates to a bearing comprising such a strip.

BACKGROUND

Highly rated internal combustion engines have conventionally used crankshaft bearings comprising a copper-based or an aluminium-based bearing alloy bonded to a backing or substrate material, for example a low-carbon steel backing. The running surface of the bearing, i.e. that surface which faces the engine crankshaft journal surface, is commonly provided with a so-called overlay coating or sliding layer. The sliding layer may be a metal layer, comprising, for example, lead, tin, bismuth, silver, copper alloys, or aluminium alloys. Alternatively, the sliding layer material may be a non-metal, polymeric, material comprising an artificial resin base, or matrix, and an additive for enhancing the load carrying capacity and/or wear resistance of the bearing. A suitable polymer overlay is provided in published UK patent application no. GB0822346A.

As engines have become smaller, they have had to become more highly loaded to provide sufficient power and efficiency to meet demands. Aluminium based bearing alloys are typically not able to survive in these more demanding, highly loaded applications, which may have mean specific loads of >90 MPa, or >100 MPa. In these more demanding applications, bronze based alloys are typically used instead, but bronze alloy based bearing are significantly more expensive than aluminium alloy based bearings.

For years, developments in bearing technology for engines have focussed on the development of polymer overlays which commonly provide good resistance to wear. Whilst the technical advantages of overlay coated bearings are well documented, aluminium alloy based bearings are not able to reliably perform in the more demanding applications with mean specific loads of >90 MPa even with a polymer overlay.

However, in order to bring down the cost of engines, in particular engine bearings, efforts are being made to develop aluminium alloy bearing elements which have higher fatigue strength than previous aluminium alloy bearing elements, so that they may replace bronze alloy based bearings in the more demanding applications.

Typically, bimetal strips of a backing material and an aluminium alloy for use in bearing elements need to be heat treated at temperatures between about 275° C. and about 350° C. for extended periods (at least three hours, and typically between three and twelve hours) so as to recrystallize the aluminium phase to eradicate directional weak phases.

Published International patent application WO2019137673A1 provides one such effort to develop aluminium alloy bearing elements which have higher fatigue strength than previously available aluminium alloy bearing elements. WO'673 provides a bearing element having a metal support layer, a bearing metal layer made of lead-free aluminium alloy, and a polymer running layer. The metal support layer and bearing metal layer are heat treated at a temperature of between 280° C. to 350° C. for two to ten hours. The bearing metal layer is blasted with a jet pressure of 1.0 to 1.5 bar to create an aluminium-oxide-rich surface zone of thickness 0.5 to 5 μm, so as to allow the polymer layer to be coated onto the lead-free aluminium alloy.

None of the efforts to develop aluminium alloy bearing elements which have higher fatigue strength than previous aluminium alloy bearing elements have achieved satisfactory fatigue strength while also allowing for economical manufacturing of strips.

The inventors have appreciated that with an increasing demand for smaller engines and as higher load applications for bearings become more common, more cost-effective methods for manufacturing strips for aluminium alloy bearing elements having improved fatigue strength are required to allow for smaller engines to be produced more economically.

SUMMARY

The present invention is defined by the appended independent claims, to which reference should now be made.

The present invention, in a first aspect, provides a method of manufacturing a strip for a bearing. In a second aspect, the present invention provides a strip for a bearing manufactured by the method of the first aspect. In a third aspect, the present invention provides a bearing manufactured by the method of the first aspect, or a bearing comprising a strip of the second aspect. In a fourth aspect, the present invention provides a strip for a bearing. In a fifth aspect, the present invention provides a bearing comprising a strip of the fourth aspect.

In particular, the present invention in a first aspect provides a method of manufacturing a strip for a bearing, the method comprising: roll-bonding a bearing layer comprising a tin-free aluminium alloy directly to a base layer to form a bimetal; and heat-treating the bimetal at a temperature below a recrystallization initiation temperature of the aluminium alloy.

Preferably, the method is a method of manufacturing a strip for a bearing suitable for highly loaded applications. A highly loaded application may be an application with mean specific loads of over 80 MPa; or over 90 MPa; or over 100 MPa.

The method is a method of manufacturing a bearing strip. A bearing strip is a strip for making a bearing shell, or a bearing half shell. Such a bearing shell, or a half bearing shell, may be suitable for a bearing for highly loaded applications.

Roll-bonding the bearing layer directly onto a base layer may mean that the method embodying the present invention in the first aspect may be simpler and more cost-effective than prior art methods which typically require the application of an interlayer between the bearing layer and the base layer. By using a tin-free aluminium alloy, the aluminium alloy of the bearing layer of the strip manufactured by a method embodying the present invention may have no directional weak phases in its microstructure, which typically result in poor fatigue strength of cold-worked aluminium alloys. In contrast, aluminium alloys comprising tin of bearing layers of the prior art comprise directional weak phases after roll-bonding, requiring heat treatment at higher temperatures above the recrystallization temperature of the aluminium alloy.

The inventors have appreciated that the strip manufactured by a method embodying the present invention does not require heat treatment at a temperature above a recrystallization initiation temperature of the aluminium alloy because there are no directional weak phases in the roll bonded aluminium alloy. The inventors have unexpectedly found that a strip manufactured by a method embodying the present invention exhibits improved properties, such as improved fatigue strength, compared to prior art strips, without requiring an interlayer between the base layer and the bearing layer or a heat treatment at a temperature above the recrystallization initiation temperature of the aluminium alloy.

Indeed, in the prior art, the strengthening/hardening that is achieved in the aluminium alloy layer by cold-working is typically reduced when a bimetal strip is heat-treated at temperatures above the recrystallization initiation temperature of the aluminium alloy, as the lattice strain which results in increased strength is released as the aluminium alloy recrystallizes. As heat treatment at such high temperatures is avoided in methods embodying the present invention, the strengthening/hardening may be retained.

Although the recrystallization initiation temperature depends on the composition of the aluminium alloy and the amount of cold work the aluminium alloy has received, the recrystallization initiation temperature of an aluminium alloy in a strip may be readily determined by methods known to the skilled person.

Preferred or advantageous features of the invention are set out in the dependent claims to which reference should now be made.

In preferred embodiments, the bimetal may be heat-treated at a temperature less than 250° C. In more preferred embodiments, the temperature may be less than 230° C., yet more preferably less than 210° C., most preferably about 200° C.

Advantageously, the use of a lower heat treatment temperature compared to known heat treatments of aluminium alloy bearing elements, may result in methods embodying the present invention being more economical compared to methods of the prior art. Additionally, as the lower temperature heat treatment of methods embodying the present invention is below the recrystallization initiation temperature of the aluminium alloy, the bond between the aluminium alloy and the backing layer may not be jeopardised by the heat treatment. As such, there may be no need for an interlayer to be provided.

Preferably, a thickness reduction of the aluminium alloy during roll-bonding is at least 40%. More preferably, the thickness reduction is at least 50%.

Advantageously, a thickness reduction of 50% or more may provide sufficient bond strength of the aluminium alloy/base layer bond without the need for an interlayer. The larger the alloy reduction, the more new surface is created during bonding and the better the bond between the aluminium alloy and the base layer. For example, at a thickness reduction of the aluminium alloy of 30%, the bonding would not be sufficient and the aluminium alloy would likely separate.

More preferably, the thickness reduction may be between 40% and 70%, and yet more preferably, between 40% and 60%, and most preferably between 50% and 60%.

Preferably, the aluminium alloy is substantially free of any soft phase elements. Advantageously, a soft phase-free aluminium alloy may not have any directional weak phases after roll bonding.

These directional weak phases, which are a result of cold working (i.e. roll bonding the aluminium alloy to the backing material), are formed by soft phases which are typically incorporated into aluminium alloys to improve embeddability, seizure resistance, and conformability.

Herein, the term "substantially free of any soft phase elements" refers to the aluminium alloy not having any element, or combination of elements, which form a soft phase, apart from incidental impurities. As such, an aluminium alloy may be substantially soft phase-free if it has a concentration of soft phase elements of less than 0.5 wt %, preferably less than 0.2 wt %, more preferably less than 0.1 wt %, most preferably less than 0.05 wt %. The following elements are soft phase forming elements: Lead; Tin; and Bismuth The following elements may further be considered soft phase forming elements: Antimony; Silver; and Indium.

Aluminium alloys of the wrought aluminium-manganese family (3xxx) may be suitable aluminium alloys. In particular, the aluminium alloy may be one of A3003; A3004; and A3104. These may be commonly available or 'off-the-shelf' aluminium alloy compositions. As such, methods embodying the present invention may allow for the strip to be manufactured economically.

In preferred embodiments, the aluminium alloy comprises at least 90 wt % Al. In more preferred embodiments, the aluminium alloy comprises at least 95 wt % Al. This may allow for improved fatigue strength and work hardening when compared to aluminium alloys comprising less Al.

Preferably, the aluminium alloy comprises between 0.5 wt % and 2.0 wt % Mn.

Preferably, the aluminium alloy comprises between 0.5 wt % and 2.0 wt % Mg.

More preferably, the aluminium alloy comprises between 0.5 wt % and 2.0 wt % Mn and between 0.5 wt % and 2.0 wt % Mg.

Advantageously, including an increasing content of manganese (Mn) in the aluminium alloy may result in strengthening of the aluminium alloy. Because Mn is a grain refining agent, the inclusion of Mn may result in smaller aluminium grains and thereby may strengthen the aluminium alloy by solid solution hardening.

The inventors have further appreciated that there may be benefits associated with the addition of Mn in the aluminium alloy in correcting the shape of acicular or of plate-like iron constituents and thereby decreasing their embrittling effect.

Advantageously, including an increasing content of magnesium (Mg) in the aluminium alloy may result in further strengthening of the aluminium alloy, because Mg may have a solidifying effect by forming an Al3Mg2 intermetallic phase.

Preferably, the aluminium alloy comprises at least 0.05 wt % Cu. A primary purpose of copper (Cu) is to strengthen the aluminium alloy.

More preferably, the aluminium alloy comprises between 0.8 wt % and 1.4 wt % Mn; and between 0.8 wt % and 1.3 wt % Mg. Advantageously, at these concentrations of Mn and Mg, the strengthening effect, decreased embrittling effect, and solidifying effect of their inclusion is balanced with the additional cost of increased Mn and Mg inclusion (compared to not including any Mn and Mg).

Yet more preferably, the aluminium alloy comprises at least one of: about 0.6 wt % Si; about 0.8 wt % Fe; between 0.05 wt % and 0.25 wt % Cu; about 0.25 wt % Zn; about 0.1 wt % Ti; about 0.05 wt % Ga; about 0.05 wt % V.

Inclusion of silicon (Si) at such a concentration may provide an effective balance between wear resistance, strength and ease of manufacture. Iron (Fe) may be present in the aluminium alloy due to technical impurities.

A primary purpose of copper (Cu) is to strengthen the Aluminium alloy composition. Its inclusion in the composition is important to increase the high temperature strength (e.g. during heat treatment) of the aluminium alloy if it comprises a high Si content. Titanium (Ti), when included, may act as a grain refiner. Gallium (Ga), when included, may act as a secondary strengthening/re-crystallisation inhibitor for the aluminium alloy. Vanadium (V), when included, may act as a secondary strengthening/re-crystallisation inhibitor for the aluminium alloy.

Alternatively, the aluminium alloy comprises between 1.0 wt % and 1.5 wt % Mn; and between 0.8 wt % and 1.3 wt % Mg. Advantageously, at these concentrations of Mn and Mg, the strengthening effect, decreased embrittling effect, and solidifying effect of their inclusion is balanced with the additional cost of increased Mn and Mg inclusion (compared to not including any Mn and Mg). Preferably, the aluminium alloy further comprises at least one of: about 0.3 wt % Si; about 0.7 wt % Fe; about 0.25 wt % Cu; about 0.25 wt % Zn.

Alternatively, the aluminium alloy comprises between 1.0 wt % and 1.5 wt % Mn, but no Mg (apart from incidental impurities). Preferably, the aluminium alloy further comprises at least one of: about 0.6 wt % Si; about 0.7 wt % Fe; between 0.05 wt % and 0.20 wt % Cu; about 0.1 wt % Zn.

Preferably, a bearing comprising the strip manufactured by methods embodying the present invention, at a load of 110 MPa, has a fatigue test pass rate of at least 90%. More preferably, the fatigue test pass rate is at least 95%. Yet more preferably, the fatigue pass rate is at least 99%. Advantageously, such a bearing may be employed in highly loaded applications which currently require the use of bronze based alloys.

Prior art bearings comprising strips comprising a tin-containing aluminium alloy having a polymer coating can achieve 80% pass rates at a load of about 103 MPa.

Preferably, a bearing comprising the strip manufactured by methods embodying the present invention has a fatigue load of at least 120 MPa. More preferably, the fatigue load is at least 130 MPa. Yet more preferably, the fatigue load is at least 131 MPa.

Advantageously, such surprisingly high fatigue loads may allow for a bearing comprising the strip manufactured by methods embodying the present invention to be used for highly load applications, and may further enable the strip to be applicable to such applications in the future.

Preferably, a hardness loss of a bearing comprising the strip after 500 hours in a soak test at 160° C. is less than 20%. More preferably, the hardness loss is less than 17.5%. Yet more preferably, the hardness loss is about 15%.

Advantageously, the reduced hardness loss compared to bearings comprising prior art strips may decrease the risk of failure of a bearing made using the strip manufactured by methods embodying the present invention for the lifetime of an engine or other component comprising the bearing.

Preferably, a crystal structure of the aluminium alloy is not recrystallized at all after roll-bonding. Although there is no recrystallization, there may be some stress relief in the aluminium alloy. Because the bimetal is heat-treated at a temperature below a recrystallization initiation temperature of the aluminium alloy, the strength from cold working in the aluminium alloy is retained.

The inventors have unexpectedly found that the bond strength between the aluminium alloy and the base layer, and thus the adhesion of the bearing layer to the base layer, is sufficiently high without requiring a high temperature heat treatment.

Preferably, the base layer comprises steel. More preferably, the base layer comprises low-carbon steel. Steel is affordable and has good properties as a base layer.

In preferred embodiments, the method further comprises coating a surface of the bearing layer with a sliding layer to form a running surface. Advantageously, coating the aluminium alloy with a sliding layer may provide good resistance to wear.

The sliding layer may be a metal layer comprising at least one of: lead, tin, bismuth, silver, copper alloys, or aluminium alloys, or it may be a non-metal, polymeric, material comprising an artificial resin base, or matrix, and an additive for enhancing the load carrying capacity and/or wear resistance of the bearing.

Preferably, the sliding layer is a polymer overlay.

Preferably, the method further comprises bending the strip to form at least a portion of the bearing.

In some embodiments, the method may further comprise a step of rolling the aluminium alloy, or the base layer, before roll bonding. Additionally or alternatively, the method may comprise a step of rolling the bimetal after roll-bonding the bearing layer directly to the base layer. The additional rolling may be at lower pressures than the roll-bonding step.

In a second aspect, the present invention provides a strip for a bearing manufactured by the method of the invention in the first aspect.

In a third aspect, the present invention provides a bearing manufactured by the method of the invention in the first aspect, or a bearing comprising the strip of the invention in the second aspect.

In a fourth aspect, the present invention provides a strip for a bearing, the strip comprising: a base layer; and a bearing layer comprising a tin-free aluminium alloy, wherein the bearing layer is directly roll-bondable to the base layer to form a bimetal. The bimetal is heat-treatable at a temperature below a recrystallization initiation temperature of the aluminium alloy, so that a bearing comprising the strip has at least one of: at a load of 110 MPa, a fatigue test pass rate of at least 90%; a fatigue load of at least 120 MPa; a hardness loss after 500 hours in a soak test at 160° C. less than 20%.

Preferably, the fatigue test pass rate is at least 95%, more preferably the fatigue pass rate is at least 99%.

Preferably, the fatigue load is at least 130 MPa, more preferably the fatigue load is about 131 MPa.

Preferably, the hardness loss is less than 17.5%, more preferably the hardness loss is about 15%.

Preferably, the temperature is less than 250° C., preferably the temperature is less than 230° C., yet more preferably the temperature is less than 210° C., and most preferably the temperature is about 200° C.

Preferably, the strip further comprises a polymer overlay on the bearing layer.

Preferably, the aluminium alloy comprises: at least 90 wt % Al and between 0.5 wt % and 2.0 wt % Mn, and between 0.5 wt % and 2.0 wt % Mg.

More preferably, the aluminium alloy comprises at least 95 wt % Al.

In a fifth aspect, the present invention provides a bearing comprising a strip of the invention in the fourth aspect.

Any feature in one aspect of the invention may be applied to other aspects of the invention, in any appropriate combination. Furthermore, any, some and/or all features in one aspect may be applied to any, some and/or all features in any other aspect, in any appropriate combination. In particular, any method features provided in relation to the first aspect may be applied to any of the other aspects.

It should also be appreciated that particular combinations of the various features described and defined in any aspects of the invention may be implemented and/or supplied and/or used independently.

Although the description of preferred embodiments below may generally relate to one type of bearing half shells, methods embodying the present invention may also be used to manufacture other sliding elements such as, for example, flanged half bearings (e.g. flanged semi-annular bearings), bushings, and flanged bearings (e.g. flanged annular bearings).

BRIEF DESCRIPTION OF THE DRAWINGS

In order that the present invention may be more fully understood, some example embodiments of the present invention will now be described by way of illustration only with reference to the accompanying drawings, in which.

DETAILED DESCRIPTION

Figure 1:
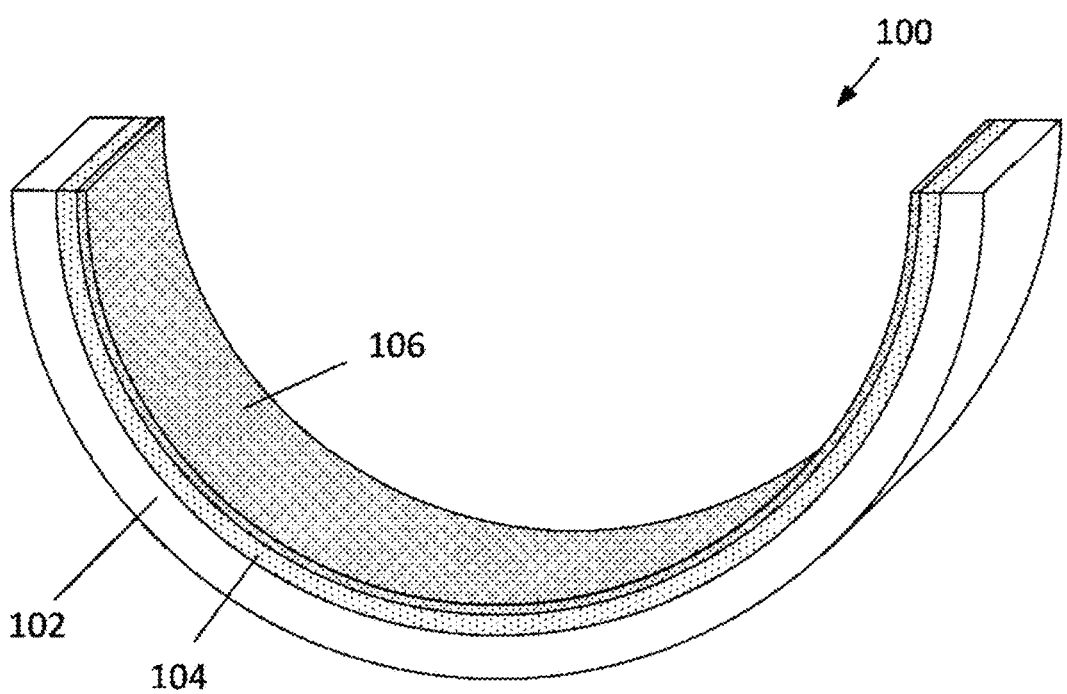
FIG. 1 shows a cross section through part of a bimetal bearing utilising a strip manufactured by a method embodying the present invention.

FIG. 1 shows a part of a bimetal bearing 100 comprising: a backing or base layer 102, a bearing layer 104 of a soft phase-free aluminium alloy, and a polymer overlay or running layer 106.

The base layer 102 is made from steel and may optionally comprise up to about 1 wt % copper. The bearing 100 does not comprise an interlayer, as the aluminium alloy of the bearing layer 104 is roll bonded directly to the steel of the base layer 102.

A surface of the bearing layer 104 of the strip may be coated 308 with a polymer overlay 106. The strip may be bent to form at least a portion of a bearing, such as a half shell of the bimetal bearing 100 shown in FIG. 1.

Suitable polymer overlays 106 may be as described in GB0822346A. The polymer overlay 106 may comprise polyimide/amide plastics and/or fluoropolymer.

The aluminium alloy is a standard, commercially available aluminium alloy of the wrought aluminium-manganese family. Suitable alloys include A3003, A3004, and A3104. The elemental compositions of these suitable standard alloys are shown in Table 1.

TABLE 1 elemental compositions of A3003, A3004, and A3104.

|  | A3003 | A3004 | A3104 |
|---|---|---|---|
| Aluminium (Al) | balance | balance | balance |
| Manganese (Mn) | 1.0-1.5 wt % | 1.0-1.5 wt % | 0.8-1.4 wt % |
| Magnesium (Mg) | — | 0.8-1.3 wt % | 0.8-1.3 wt % |
| Silicon (Si) | 0.6 wt % | 0.3 wt % | 0.6 wt % |
| Iron (Fe) | 0.7 wt % | 0.7 wt % | 0.8 wt % |
| Copper (Cu) | 0.05-0.2 wt % | 0.25 wt % | 0.05-0.25 wt % |
| Zinc (Zn) | 0.10 wt % | 0.25 wt % | 0.25 wt % |
| Titanium (Ti) | — | — | 0.10 wt % |
| Gallium (Ga) | — | — | 0.05 wt % |
| Vanadium (V) | — | — | 0.05 wt % |
| Residuals | 0.15 wt % | 0.15 wt % | 0.15 wt % |

The wt % content of the various elements is the wt % content of the relevant element in the final aluminium alloy as applied to a sliding element component (a bearing for an engine or motor) rather than the wt % content of the initial mixture used to form the aluminium alloy.

Some suitable techniques for measuring the wt % content of the various elements of the aluminium alloy, where present, that are referred to in the present specification comprise the following:

(i) X-Ray Fluorescence spectroscopy (XRF); and (ii) Optical Emission Spectroscopy (OES).

The skilled person will be aware that there will be other suitable techniques for measuring the wt % of the various elements of the final aluminium alloy as applied to a bearing to ensure that they are present in the aluminium alloy with the specified content.

Figure 2:
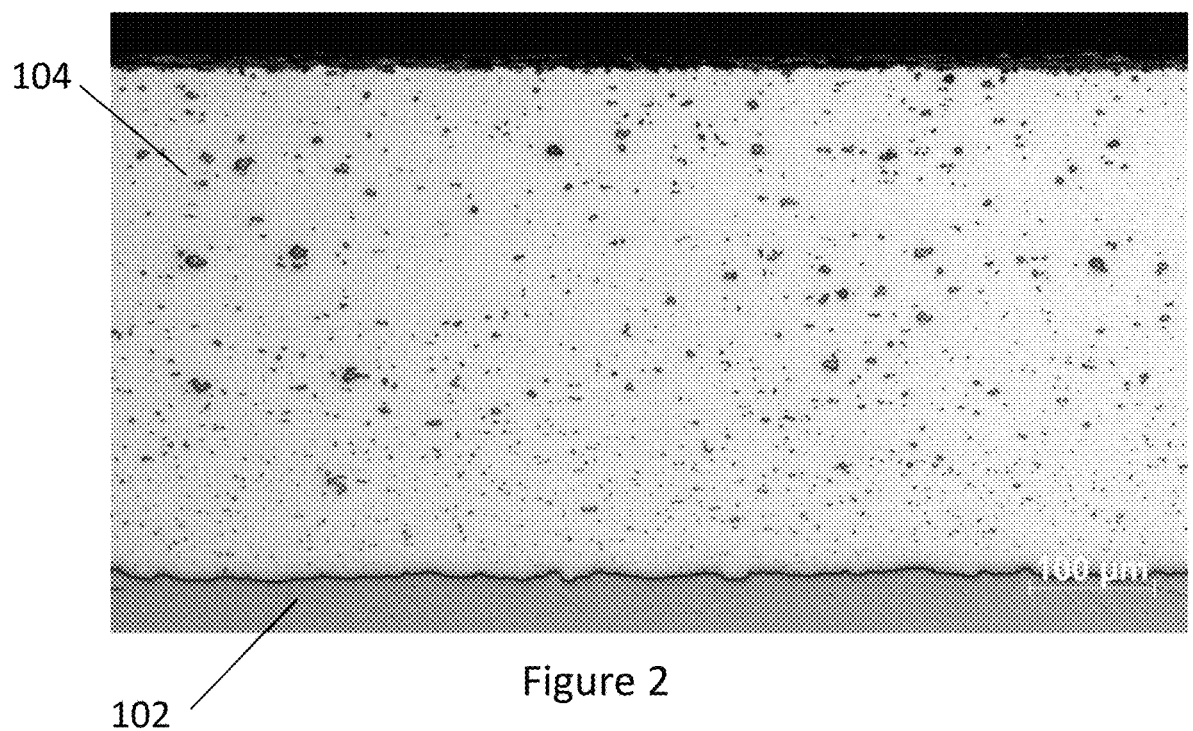
FIG. 2 shows a micrograph of a strip manufactured by a method embodying the method of the present invention.

FIG. 2 shows a micrograph of a strip forming at least a portion of the bimetal bearing 100 of FIG. 100, showing the aluminium alloy in the bearing layer 104 after roll-bonding directly to a low-carbon steel base layer 102. The aluminium alloy in the bearing layer 104 comprises no directional weak phases, because it does not contain tin or any other soft phase elements.

Figure 3:
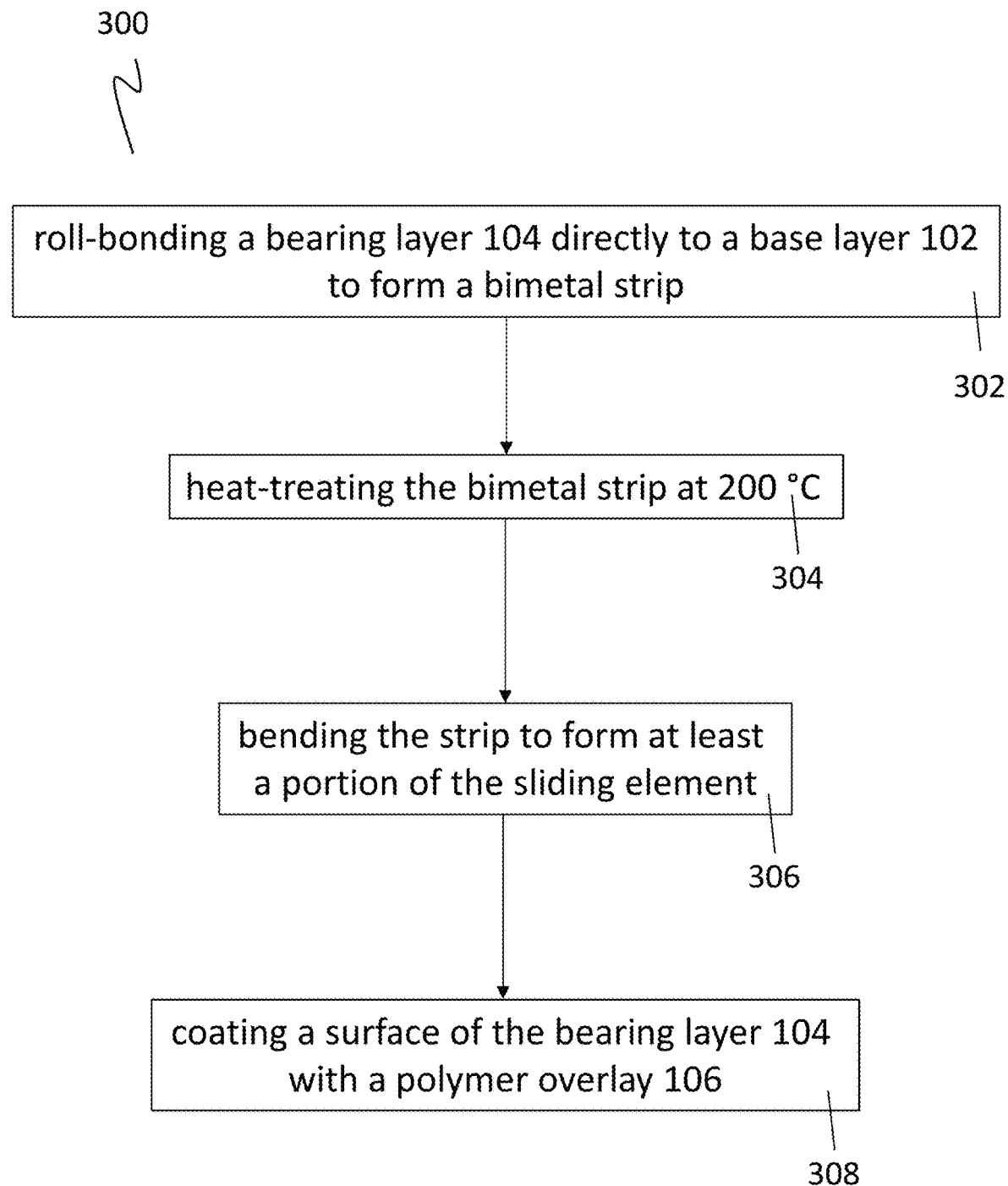
FIG. 3 shows a flow diagram of a method embodying the present invention.

FIG. 3 shows a flow diagram of a method 300 embodying the present invention. In a first step, a suitable tin-free aluminium alloy is roll-bonded directly to a steel base layer 102 to form a bimetal strip. The roll-bonding of the bimetal results in a minimum thickness reduction of the aluminium alloy of 50% so as to provide sufficient bond strength between the aluminium alloy bearing layer 104 and the steel base layer 102. In particular, the thickness reduction may be between 50% and 60%.

While a higher thickness reduction typically results in better bond strength, it can be difficult to achieve very high thickness reductions (e.g. above 55%, or above 60%) without impacting on other properties of the strips/bearings. The achievable thickness reduction will depend on the rolling mill used—a higher aluminium alloy thickness reduction is achieved on a 3-high rolling mill than a 4-high rolling mill. For a 4-high rolling mill, a thickness reduction of at least 50%, preferably of 50 to 60%, is preferable and achievable.

The roll-bonded bimetal strip is then heat-treated 304, in air, for one to fifteen hours, preferably for eight to twelve hours, at a temperature of 200° C., which is below the recrystallization initiation temperature of the aluminium alloy. As such, the microstructure of the aluminium alloy is not recrystallized, so that the adhesion of the bearing layer to the base layer is not jeopardised, and the strengthening/hardening from cold working in the aluminium alloy is retained. If the same bimetal strip were heat-treated at a temperature of 300° C., the aluminium alloy would recrystallize, which would result in a significant drop in hardness.

The strip heat-treated in step 304 is bent 306 to shape so as to form at least a portion of a bearing, such as a bearing or half-bearing shell. A surface of the bearing layer 104 of the strip may be coated in step 308 with a polymer overlay 106. The step of coating 308 a surface of the bearing layer 104 may be carried out before the step of bending 306 the strip, or, more preferably, coating 306 of a surface of the bearing layer 104 may be carried out after the strip has been bent to shape, i.e. to form a half shell of the bimetal bearing 100.

FIGS. 4 to 7 show results from testing of strips and bearings manufactured by the method 300, having a low carbon steel base layer and a A3104 bearing layer.

Figure 4:
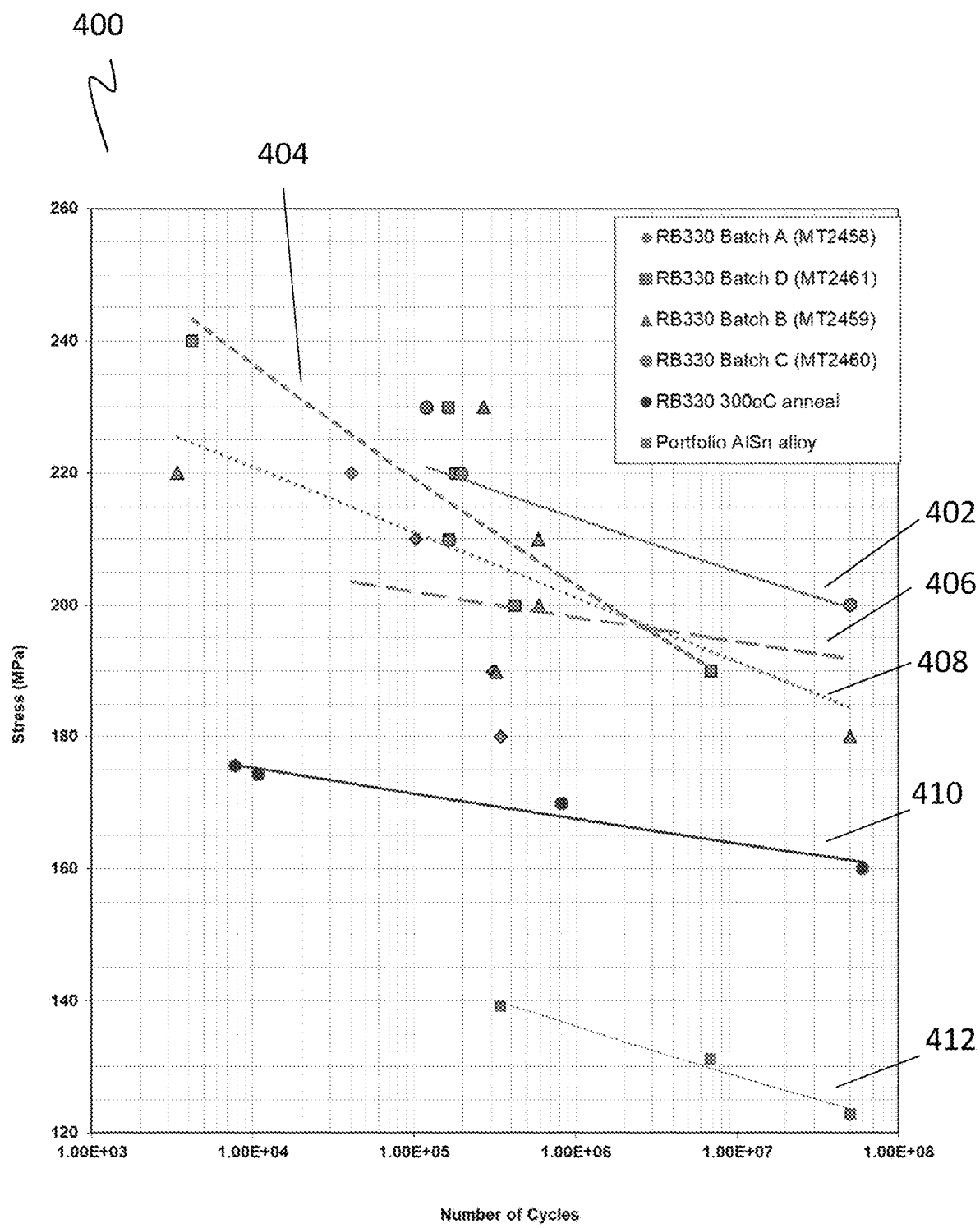
FIG. 4 provides the results of a high-cycle fatigue test for four batches of preferred example strips manufactured by a method embodying the present invention, a baseline tin-containing aluminium alloy strip of the prior art, and a tin-free aluminium alloy strip heat-treated at 300° C. for comparison.

FIG. 4 shows the results of high-cycle fatigue testing 400 for four batches of strips manufactured using the method 300 as compared to a strip manufactured by a method embodying the present invention, except that it was heat treated at 300° C., and a prior art tin/aluminium alloy strip. The high-cycle fatigue testing 400 was carried out on flat bimetal strip samples without polymer coating. "Dog bone" test specimens were used for the high-cycle fatigue testing on a Rumul Mikrotron test machine.

The high-cycle fatigue testing was carried out by repeatedly loading samples of strips at a stress amplitude (plotted on the left hand axis) for up to 50,000,000 cycles until failure. As shown by lines 402, 404, 406, and 408, the strips manufactured by methods embodying the present invention, could be loaded with significantly higher stress amplitudes than the sample 410 heat-treated at 300° C., and the prior art tin/aluminium alloy strip 412. The recorded average stress and cycles to failure are shown in Table 2.

TABLE 2

High-cycle fatigue testing results for four strips manufactured by a method embodying the present invention (RB330 Batch A to D—lines 402, 404, 406, and 408), a strip annealed at a higher temperature (RB330 300° C. anneal—line 410), and a strip comprising a portfolio AlSn alloy (Portfolio AlSn alloy—line 412).

|  | Cycles to Failure | Recorded average stress in |
|---|---|---|
| RB330 Batch A | 343512 | 179.8865 |
|  | 308473 | 189.919 |
|  | 50000000 | 199.9894 |
|  | 40754 | 219.9939 |
|  | 102946 | 209.934 |
| RB330 Batch B | 591028 | 209.9 |
|  | 269470 | 229.9 |
|  | 595887 | 199.9 |
|  | 3441 | 220.0 |
|  | 321820 | 189.9 |
|  | 50000000 | 180.0 |
| RB330 Batch C | 164656 | 209.9 |
|  | 195833 | 219.9 |
|  | 119638 | 229.9 |
|  | 50000000 | 200.0 |

TABLE 2-continued

High-cycle fatigue testing results for four strips manufactured by a method embodying the present invention (RB330 Batch A to D—lines 402, 404, 406, and 408), a strip annealed at a higher temperature (RB330 300° C. anneal—line 410), and a strip comprising a portfolio AlSn alloy (Portfolio AlSn alloy—line 412).

|  | Cycles to Failure | Recorded average stress in |
|---|---|---|
| RB330 Batch D | 180817 | 219.9 |
|  | 162104 | 229.9 |
|  | 4231 | 240.0 |
|  | 163514 | 210.0 |
|  | 418723 | 199.9 |
|  | 6888218 | 190.0 |
| RB330 300° C. anneal | 10809 | 174.4 |
|  | 7734 | 175.6 |
|  | 60000000 | 160.0 |
|  | 816242 | 169.9 |
| Portfolio AlSn alloy | 341700 | 139.2 |
|  | 6847200 | 131.2 |
|  | 50000000 | 122.7 |

Figure 5:
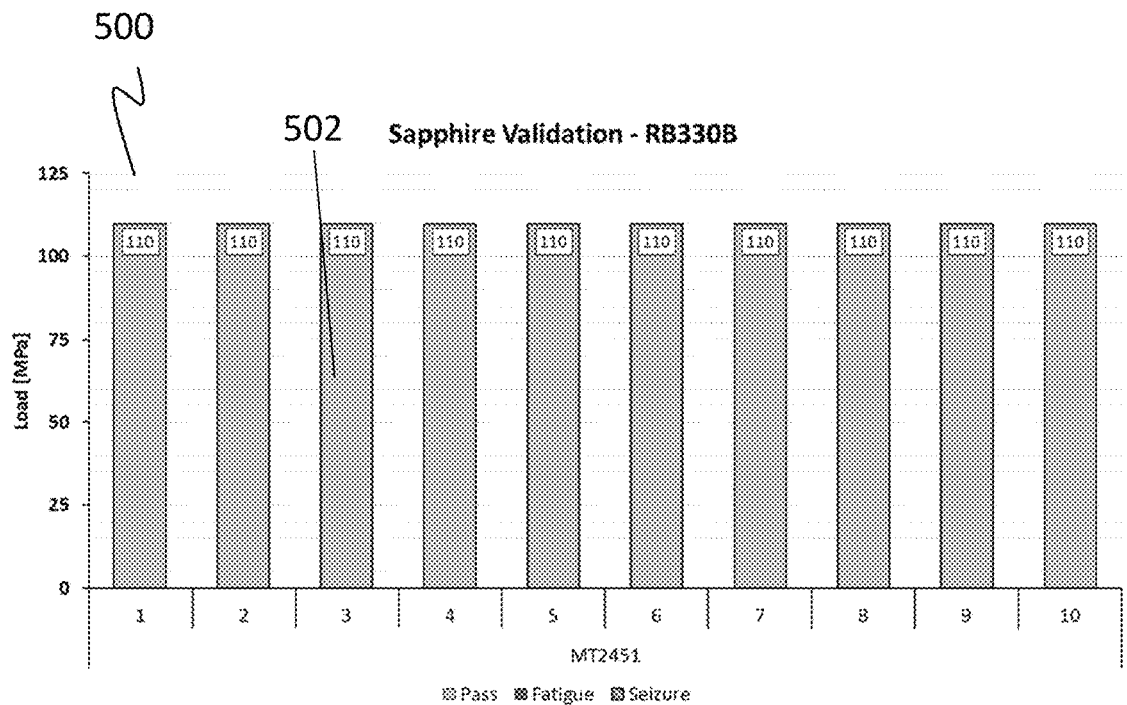
FIG. 5 provides the results of a bearing fatigue load test for preferred example bearings comprising strips manufactured by a method embodying the present invention.
Figure 6:
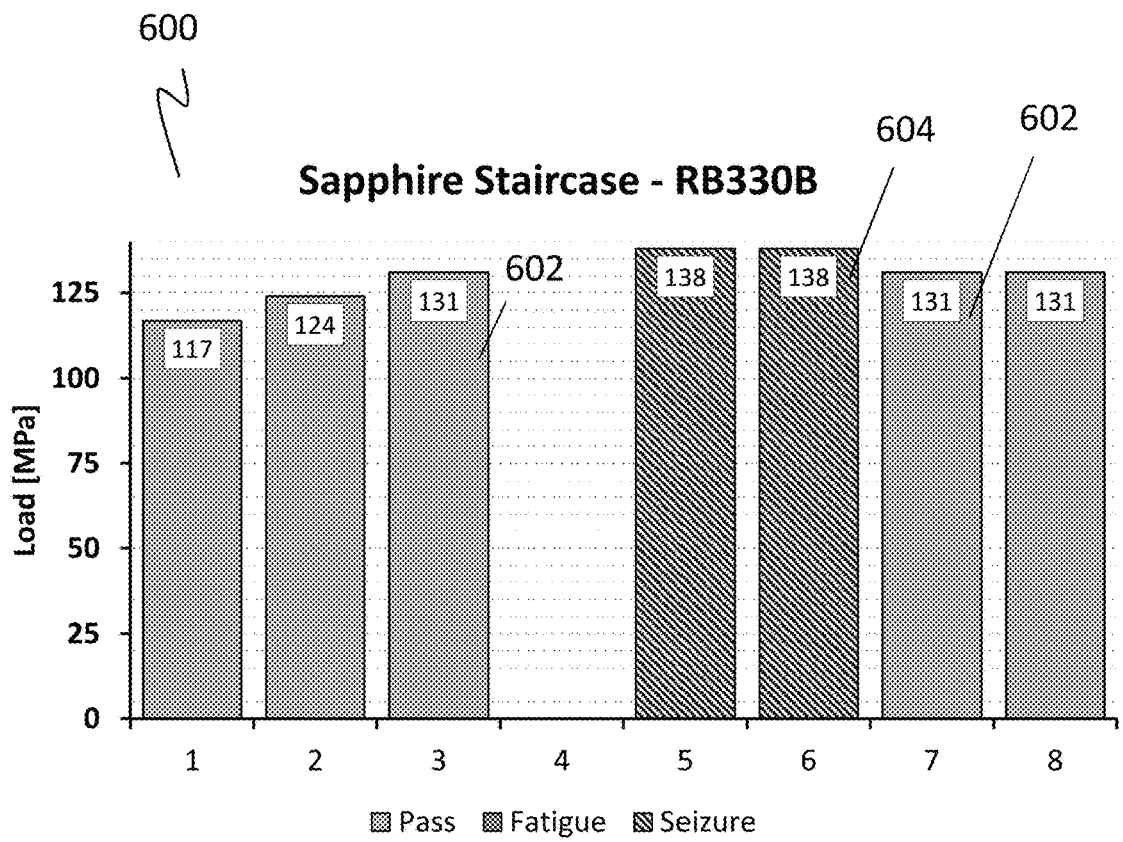
FIG. 6 provides the results of a staircase fatigue load test for preferred example bearings comprising strips manufactured by a method embodying the present invention.

FIGS. 5 and 6 show the results of bearing fatigue testing of bearings made from strips manufactured using the method 300. The bearing shells used in these tests have dimensions of typical passenger car connecting rod bearings. The bearings had a wall thickness of about 1.81 mm. The bearings used in the bearing fatigue load test shown in FIG. 5 were coated with a polymer overlay.

A typical prior art tin/aluminium alloy bearing may achieve a pass rate of about 80% at a load of 103 MPa. As shown in FIG. 5, the bearings made from the strips manufactured using the method 300 showed a 100% pass rate in the bearing fatigue testing 500 at a load of 110 MPa. Each sample 502 passed the bearing fatigue testing 500 at a load of 110 MPa.

Indeed, as shown in FIG. 6, for bearing fatigue testing 600 at loads above 110 MPa, the bearings made from strips manufactured using the method 300 passed 602 at loads of up to 131 MPa, and even at loads of 138 MPa, the bearings seized 604 but did not fail.

The results shown in FIG. 6 were obtained using a staircase method according to ISO 12107.

Figure 7:
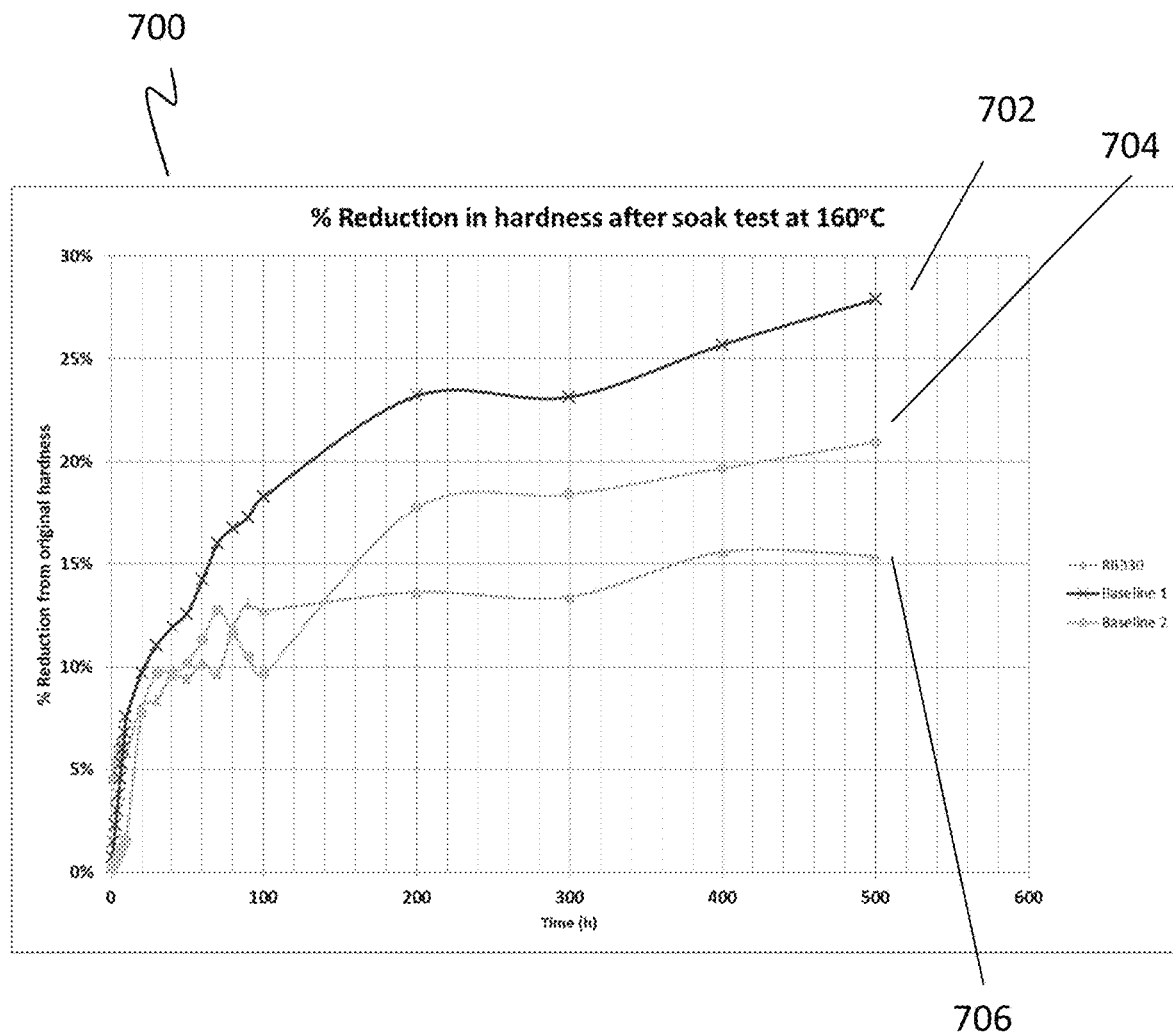
FIG. 7 provides the results of a hardness loss test for a preferred example bearings comprising at least one strip manufactured by a method embodying the present invention.

The surprisingly good properties of the bearings using strips manufactured by the method 300 are also shown in FIG. 7, which shows the results of a hardness loss soak test 700.

For the hardness loss soak test 700, bearings comprising strips, manufactured by a method embodying the present invention, but without an overlay coat, were soaked (heated at a constant temperature for a length of time) at 160° C. for up to 500 hours in air, so as to test the hardness durability of the bearing in an environment that is comparable to an engine application. The hardness before and after soaking was determined using a Vickers test according to ISO 6507. The bearings may or may not be sectioned prior to hardness testing.

Lines 702 and 704 show that two prior-art tin/aluminium alloy bearings showed hardness losses of about 28% and 21% after 500 hours, whereas the bearings 706 using strips manufactured by the method 300 showed hardness losses of about 15% after 500 hours.

Although described herein and illustrated in the drawing in relation to a half bearing shell, methods embodying present invention may equally be used to manufacture other sliding elements, including, for example, bushes, and engines comprising such sliding engine components.

The invention claimed is:

1. A method of manufacturing a strip for a bearing, the method comprising:
   roll-bonding a bearing layer comprising a tin-free aluminium alloy directly to a base layer to form a bimetal;
   heat-treating the bimetal at a temperature below a recrystallization initiation temperature of the tin-free aluminium alloy without performing a heat treatment to the bimetal at temperatures above the recrystallization initiation temperature of the tin-free aluminium alloy; and
   coating a surface of the bearing layer with a sliding layer;
   wherein only the bearing layer is roll-bonded to the base layer.

2. The method according to claim 1, wherein the bimetal is heat-treated at a temperature less than 250° C.; and
   the sliding layer comprises a polymer overlay.

3. The method according to claim 1, wherein a thickness reduction of the aluminium alloy during roll-bonding is at least 40%.

4. The method according to claim 1, wherein the aluminium alloy is substantially free of any soft phase elements.

5. The method according to claim 1, wherein the aluminium alloy comprises at least 90 wt % Al.

6. The method according to claim 1, wherein the aluminium alloy comprises between 1.0 wt % and 1.5 wt % Mn.

7. The method according to claim 1, wherein a bearing comprising the strip, at a load of 110 MPa, has a fatigue test pass rate of at least 90%.

8. The method according to claim 1, wherein a bearing comprising the strip has a fatigue load of at least 120 Mpa.

9. The method according to claim 1, wherein a hardness loss of a bearing comprising the strip after 500 hours in a soak test at 160° C. is less than 20%.

10. The method according to claim 1, wherein the aluminium alloy comprises:
    between 0.5 wt % and 2.0 wt % Mn; and
    between 0.5 wt % and 2.0 wt % Mg.

11. The method according to claim 10, wherein the aluminium alloy comprises between 0.8 wt % and 1.4 wt % Mn, and between 0.8 wt % and 1.3 wt % Mg; and
    wherein the aluminium alloy comprises at least one of:
    about 0.8 wt % Fe;
    about 0.25 wt % Zn;
    about 0.1 wt % Ti;
    about 0.05 wt % Ga; and
    about 0.05 wt % V.

12. The method according to claim 10, wherein the aluminium alloy comprises:
    between 1.0 wt % and 1.5 wt % Mn, and between 0.8 wt % and 1.3 wt % Mg; and
    wherein the aluminium alloy comprises at least one of:
    about 0.7 wt % Fe;
    about 0.25 wt % Cu;
    about 0.25 wt % Zn.

13. A strip for manufacturing a bearing manufactured according to the method of claim 1.

14. A strip for a bearing, the strip comprising:
    a base layer;
    a bearing layer comprising a tin-free aluminium alloy directly roll-bonded to the base layer;
    a sliding layer disposed on a surface of the bearing layer, the sliding layer comprising a polymer overlay;
    wherein only the bearing layer is roll-bonded to the base layer to form a bimetal;
    wherein the bimetal is heat-treatable at a temperature below a recrystallization initiation temperature of the aluminium alloy without recrystallizing a microstructure of the aluminium alloy, so that a bearing comprising the strip satisfies at least one of the following:
    at a load of 110 MPa, a fatigue test pass rate of at least 90%;
    a fatigue load of at least 120 Mpa; and
    a hardness loss after 500 hours in a soak test at 160° C. is less than 20%.

15. The strip for a bearing according to claim 14, wherein the aluminium alloy contains between 0.7 wt % and 0.8 wt % of iron (Fe).

16. The strip for a bearing according to claim 14, wherein the aluminium alloy is substantially free of any soft phase elements.

17. The strip for a bearing according to claim 14, wherein the aluminium alloy comprises at least 90 wt % Al.

18. A strip for a bearing, the strip comprising:
    a base layer; and
    a bearing layer comprising a tin-free aluminium alloy, wherein the bearing layer is directly roll-bonded to the base layer to form a bimetal;
    wherein the bimetal is heat-treatable at a temperature below a recrystallization initiation temperature of the aluminium alloy, and wherein a microstructure of the aluminium alloy is not recrystallized; and
    a sliding layer coated onto a surface of the bearing layer, the sliding layer comprising a polymer overlay.

19. The strip for a bearing according to claim 18, wherein the aluminium alloy comprises:
    between 0.5 wt % and 2.0 wt % Mn; and
    between 0.5 wt % and 2.0 wt % Mg.

20. The strip for a bearing according to claim 18, wherein the aluminium alloy comprises at least one of:
    about 0.8 wt % Fe;
    about 0.25 wt % Zn;
    about 0.1 wt % Ti;
    about 0.05 wt % Ga; and
    about 0.05 wt % V.

* * * * *